(12) United States Patent
Sagawa et al.

(10) Patent No.: US 9,135,524 B2
(45) Date of Patent: Sep. 15, 2015

(54) RECOGNITION APPARATUS, RECOGNITION METHOD, AND STORAGE MEDIUM

(75) Inventors: Naotsugu Sagawa, Tokyo (JP); Kotaro Yano, Tokyo (JP); Satoshi Yashiro, Yokohama (JP)

(73) Assignee: Canon Kabushiki Kaisha, Tokyo (JP)

(*) Notice: Subject to any disclaimer, the term of this patent is extended or adjusted under 35 U.S.C. 154(b) by 366 days.

(21) Appl. No.: 13/455,011

(22) Filed: Apr. 24, 2012

(65) Prior Publication Data

US 2012/0275692 A1    Nov. 1, 2012

(30) Foreign Application Priority Data

Apr. 27, 2011    (JP) ................................. 2011-099968

(51) Int. Cl.
*G06K 9/62*    (2006.01)

(52) U.S. Cl.
CPC ............ *G06K 9/6256* (2013.01); *G06K 9/6277* (2013.01)

(58) Field of Classification Search
None
See application file for complete search history.

(56) References Cited

U.S. PATENT DOCUMENTS 8,260,063 B2 *    9/2012  Hasezawa et al. ............ 382/225

OTHER PUBLICATIONS

P. Viola and M. Jones, "Robust Real-time Object Detection," Second International Workshop on Statistical and Computational Theories of Vision, Jul. 13, 2001.
Schapire, R.E. and Singer, Y.: Improved Boosting Algorithms Using Confidence-rated Predictions, Machine Learning, pp. 297-336 (1999).
N.Dalal and B.Triggs : Histograms of Oriented Gradients for Human Detections (CVPR2005).

* cited by examiner

*Primary Examiner* — Thomas Conway
(74) *Attorney, Agent, or Firm* — Canon USA, Inc., IP Division

(57) ABSTRACT

A recognition apparatus includes a calculation unit configured to calculate likelihood of each feature quantity based on the weighted distribution of the feature quantity extracted from a plurality of learning images, a correction unit configured, if a ratio of a learning image to a specific feature quantity is equal to or smaller than a predetermined ratio and a weight for the specific feature quantity is greater than a predetermined value, to correct the value of likelihood of the specific feature quantity to lower the value based on the distribution, a setting unit configured to set the likelihood corrected by the correction unit in association with a feature quantity, and a discrimination unit to extract a feature quantity from an input image and discriminate whether the input image includes a predetermined object based on the likelihood associated with the feature quantity.

9 Claims, 14 Drawing Sheets

FIG. 8
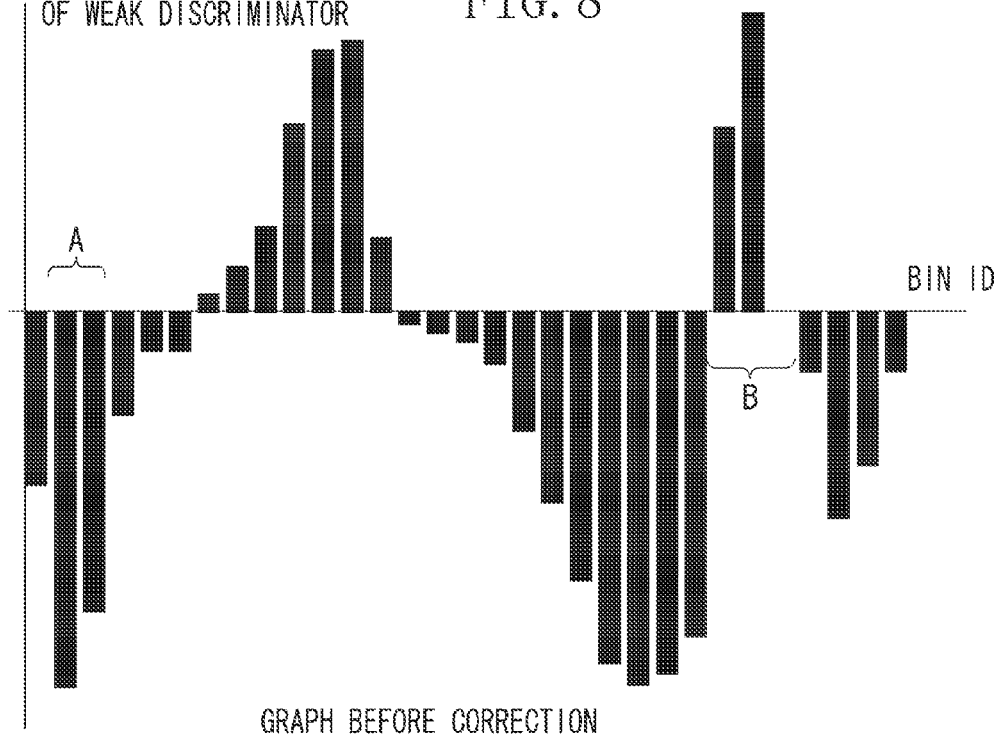
GRAPH BEFORE CORRECTION
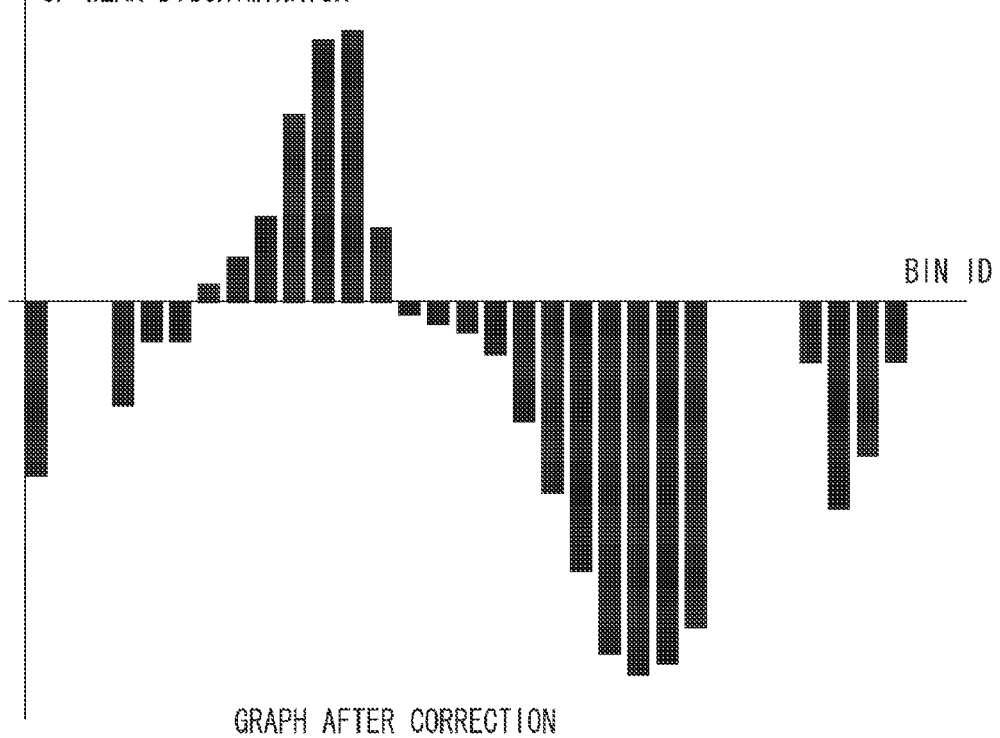
GRAPH AFTER CORRECTION

RECOGNITION APPARATUS, RECOGNITION METHOD, AND STORAGE MEDIUM

BACKGROUND OF THE INVENTION

1. Field of the Invention

The present invention relates to a recognition apparatus and a recognition method and, in particular, to a technique suitably used for detecting an object.

2. Description of the Related Art

A technique for automatically detecting a specific object pattern from an image has been applied to various fields such as image search, object detection, object recognition, and object tracking fields. In the above fields, P. Viola and M. Jones, "Robust Real-time Object Detection," SECOND INTERNATIONAL WORKSHOP ON STATISTICAL AND COMPUTATIONAL THEORIES OF VISION, Jul. 13, 2001 discusses a machine learning method referred to as AdaBoost has been proposed. AdaBoost is a machine learning method based on the concept that a discriminator strong in discrimination performance (hereinafter referred to as strong discriminator) is produced by combining a plurality of discriminators weak in discrimination performance (hereinafter referred to as weak discriminator).

The AdaBoost cannot reflect easiness of determination of an input pattern in an output value because each weak discriminator outputs a binary of 0 or 1. On the other hand, Schapire, R. E. and Singer, Y.: Improved Boosting Algorithms Using Confidence-rated Predictions, Machine Learning, pp. 297-336 (1999) discusses that Real AdaBoost improves determination performance by each weak discriminator taking discrete continuous values. The output of the strong discriminator in the Real AdaBoost is represented by the following equation (1).

$$H(x) = \text{sign}\left(\sum_{t=1}^{T} h_t(x)\right) \quad (1)$$

Where, $H(x)$ is the output of the strong discriminator with respect to an input image $x$, sign is a function whose value is determined according to a sign, and $h_t(x)$ is an output of the t-th weak discriminator. The $h_t(x)$ is expressed by the following equation (2) and calculated based on a ratio between a probability density distribution $W_+^j$ of a correct answer image and a probability density distribution $W_-^j$ of a non-correct answer image.

$$h_t(x) = \frac{1}{2}\ln\frac{W_+^j + \varepsilon}{W_-^j + \varepsilon} \quad (2)$$

Where, $\varepsilon$ is a coefficient that prevents a denominator from becoming zero and a very small value. The correct answer image is a learning image of a discrimination target. The non-correct answer image is a learning image other than the discrimination target. The probability density distribution $W_+^j$ and $W_-^j$ are represented by the following equations (3) and (4).

$$W_+^j = \sum_{i:\, j \in J \land y_i = +1}^{n} D_t(i) \quad (3)$$

$$W_-^j = \sum_{i:\, j \in J \land y_i = -1}^{n} D_t(i) \quad (4)$$

Where, $n$ is the total of learning images and $j$ is the value of feature quantity output when the weak discriminator $m$ is applied to the learning image. $J$ is the aggregation of output $j$ of the weak discriminator $m$ applied to the learning image and $i$ denotes an image ID. More specifically, the probability density distributions $W_+^j$ and $W_-^j$ are distribution in which the numbers of the correct answer images and the non-correct answer images outputting the feature quantity $j$ are added in consideration of weight $D_t(i)$ to each image. The weight $D_t(i)$ has a relationship represented by the following equation (5).

$$D_{t+1}(i) = D_t(i)\exp[-y_i h_t(x_i)] \quad (5)$$

When the image $i$ is the correct answer image ($y_i = 1$), the greater the $h_t(x)$ with a positive value, the smaller the equation (5), and the greater the $h_t(x)$ with a negative value, the greater the equation (5). On the other hand, when the image $i$ is the non-correct answer image ($y_i = -1$), the greater the $h_t(x)$ with a negative value, the smaller the equation (5), and the greater the $h_t(x)$ with a positive value, the greater the equation (5). This means that a weight with respect to a difficult image-_from which a correct output cannot be output becomes large in value and weight to an easy image from which a correct output can be output becomes small in value in the learning image. In other words, a discrimination performance is improved by focusing on learning images which are difficult to discriminate, and outputting the output of the weak discriminator with continuous values based on the probability density distribution.

However, in a conventional method, even if the number of learning images corresponding to a feature quantity is extremely fewer than the total of the learning images, the weight becomes greater if the image is difficult to discriminate, so that the output of the weak discriminator becomes high or low in value. The learning image satisfying the above conditions is significantly different in feature from other correct answer images and often has a feature in which the learning image is difficult to distinguish from a non-correct answer image. For this reason, in the conventional method, a value high in accuracy is output irrespective of the feature difficult to discriminate, i.e., the feature most probably outputting incorrect result.

SUMMARY OF THE INVENTION

The present invention is directed to providing capability of stably detecting an object even if an image including a feature pattern which is hardly included in a learning image is input.

According to an aspect of the present invention, a recognition apparatus includes a calculation unit configured to calculate likelihood of each feature quantity based on a weighted distribution of the feature quantity extracted from a plurality of learning images, a correction unit configured, if a ratio of a learning image to a specific feature quantity is equal to or smaller than a predetermined ratio and a weight for the specific feature quantity is greater than a predetermined value, to correct the value of likelihood of the specific feature quantity to lower the value based on the distribution, a setting unit configured to set the likelihood corrected by the correction unit in association with a feature quantity, and a discrimination unit configured to extract a feature quantity from an input image and discriminate whether the input image includes a predetermined object based on the likelihood associated with the feature quantity.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 8 is a chart illustrating the outputs of weak discriminators before and after correction according to the first exemplary embodiment.

DESCRIPTION OF THE EMBODIMENTS

Various exemplary embodiments, features, and aspects of the invention will be described in detail below with reference to the drawings.

Figure 1:
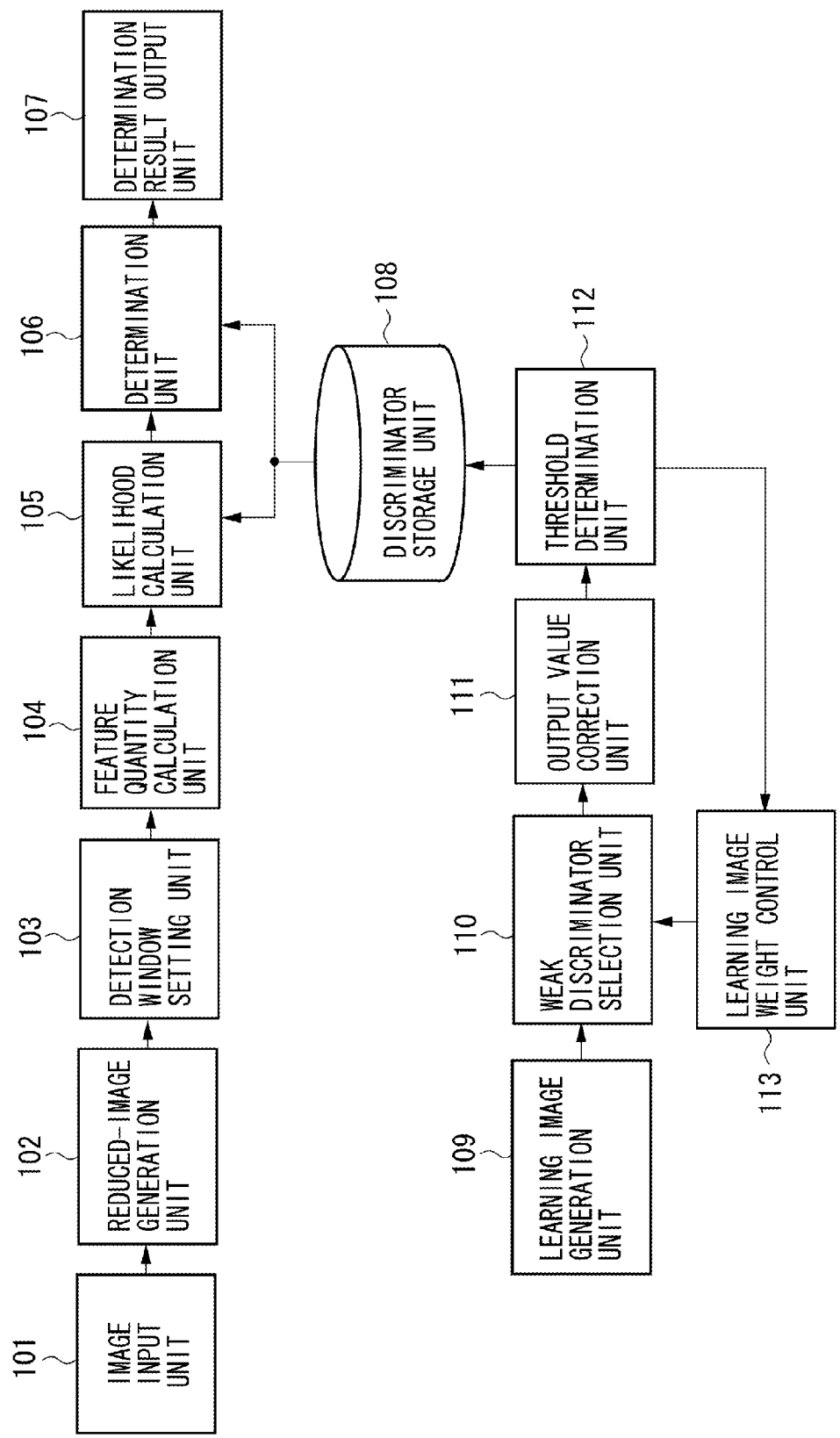
FIG. 1 is a block diagram illustrating an example of a configuration of an image processing apparatus according to an exemplary embodiment of the present invention.

FIG. 1 is a block diagram illustrating an example of a configuration of an image processing apparatus according to the present exemplary embodiment. In FIG. 1, an image input unit 101 inputs an image to be detected. A reduced-image generation unit 102 generates a several-step reduced image from the input image. A detection window setting unit 103 sets a detection window on the reduced image. A feature quantity calculation unit 104 sets a local region in the detection window to calculate a feature quantity in the local region. A likelihood calculation unit 105 calculates likelihood based on the feature quantity. A determination unit 106 determines whether the detection window is an object to be determined based on a threshold and a likelihood stored in a discriminator storage unit 108. A determination result output unit 107 outputs a determination result. The discriminator storage unit 108 stores discriminator data acquired by machine learning. A learning image generation unit 109 generates a learning image in the machine learning. A weak discriminator selection unit 110 selects a weak discriminator high in discrimination performance of the learning image. An output value correction unit 111 corrects the output value of the weak discriminator. A threshold determination unit 112 determines a threshold for the output of the weak discriminator. A learning image weight control unit 113 controls weight to the learning image. The control of processing for each block is performed by a processing control unit (not illustrated).

The present exemplary embodiment takes a human-body region as a recognition model and describes an example in which the human-body area is detected from an image. First, a machine learning method for generating a discriminator used in the present exemplary embodiment is described and then a method for detecting human-body region using the discriminator is described.

Figure 2:
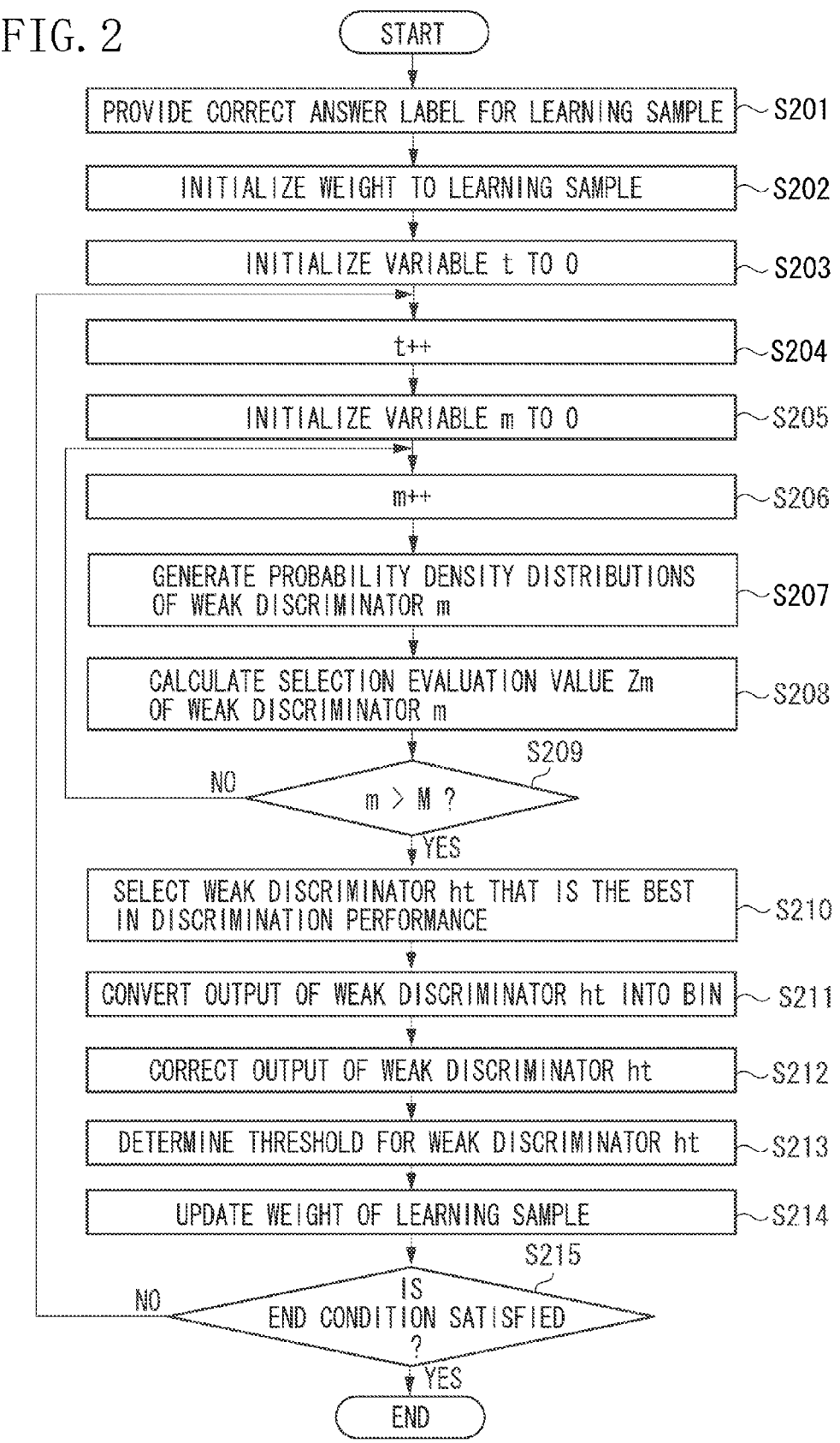
FIG. 2 is a flow chart illustrating an example of procedures for machine learning processing in a first exemplary embodiment.

FIG. 2 is a flow chart illustrating an example of processing procedure for machine learning for generating a discriminator used in the present exemplary embodiment. In step S201, the learning image generation unit 109 provides a correct answer label y for the previously collected learning image according to the following equation (6).

$$y = \begin{cases} +1 & \text{(when the learning image is a correct answer)} \\ -1 & \text{(when the learning image is a non-correct answer)} \end{cases} \quad (6)$$

In the present exemplary embodiment, N-learning images are used and each image is represented by $x_1, x_2, x_3, \ldots, x_N$. If a learning image is an desired object to be recognized, the learning image is regarded as a correct answer. Otherwise, it is regarded as a non-correct answer.

In step S202, the learning image weight control unit 113 initializes a weight D with respect to the learning image according to the following equation (7).

$$D_1(n) = \frac{1}{N} \quad (7)$$

Where, n is an image ID, $D_1(n)$ is a weight to an image in which the image ID is n at the first learning cycle. In step S203, a variable t indicating a cycle of learning is initialized to zero. In step S204, the variable t is incremented by 1. In step S205, a variable m indicating ID of the weak discriminator as a candidate is initialized to 0. In step S206, the variable m is incremented by 1.

Figure 4:
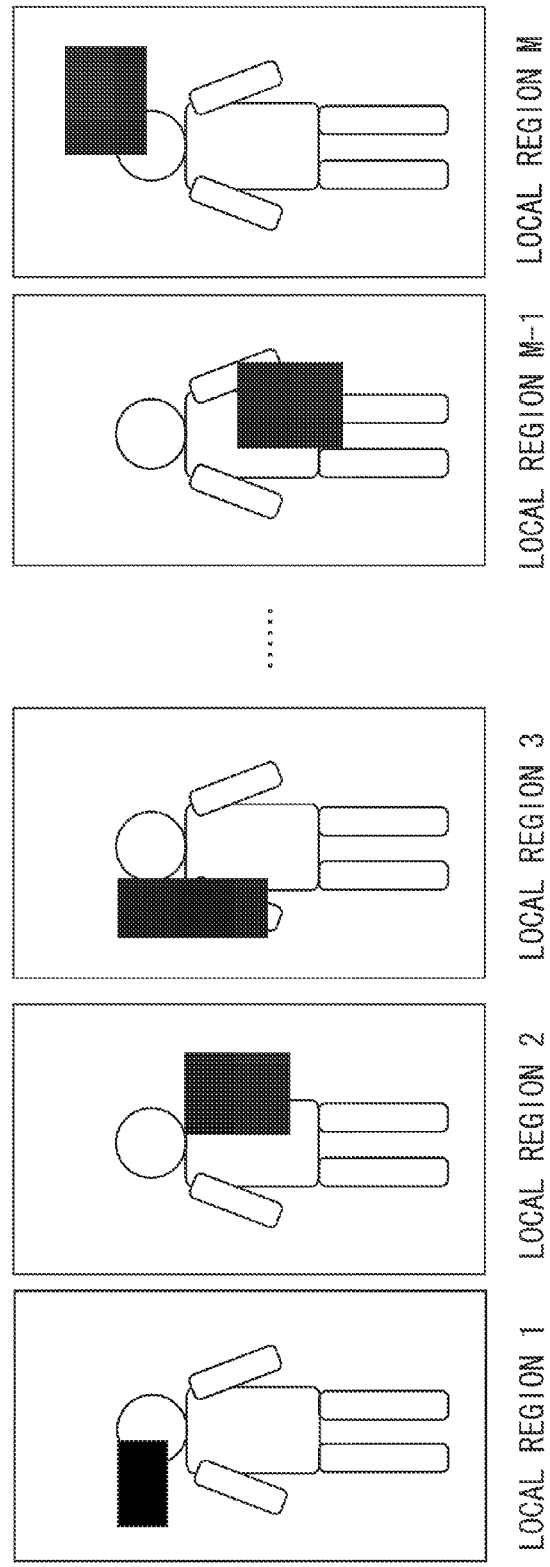
FIG. 4 illustrates local regions in a weak discriminator according to the first exemplary embodiment.

The weak discriminator in the present exemplary embodiment is composed of information about a local region set in an image and information used for calculating a feature quantity of an image from the local region. The local region used in general is rectangular. In the present exemplary embodiment, various rectangular areas different in size, aspect, and position are set as the local region. FIG. 4 illustrates examples of various local regions 1 to M.

The feature quantity may use brightness information in two rectangles like Haar-like shown in "Robust Real-time Object Detection" described above. Alternatively, the feature quantity may use information in which gradient in the rectangular area is represented by a histogram for each direction like Histograms Of Oriented Gradients (HOG) shown in N. Dalal and B. Triggs: Histograms of Oriented Gradients for Human Detections (CVPR2005). The present exemplary embodiment provides an example in which the HOG is used as the feature quantity. The HOG sets a local region referred to as a cell in the image and a local region referred to as a block including a plurality of cells. Gradient strength in each cell is represented by a histogram for each direction and the histogram is normalized in a block to calculate the feature quantity of an image.

Figure 5:
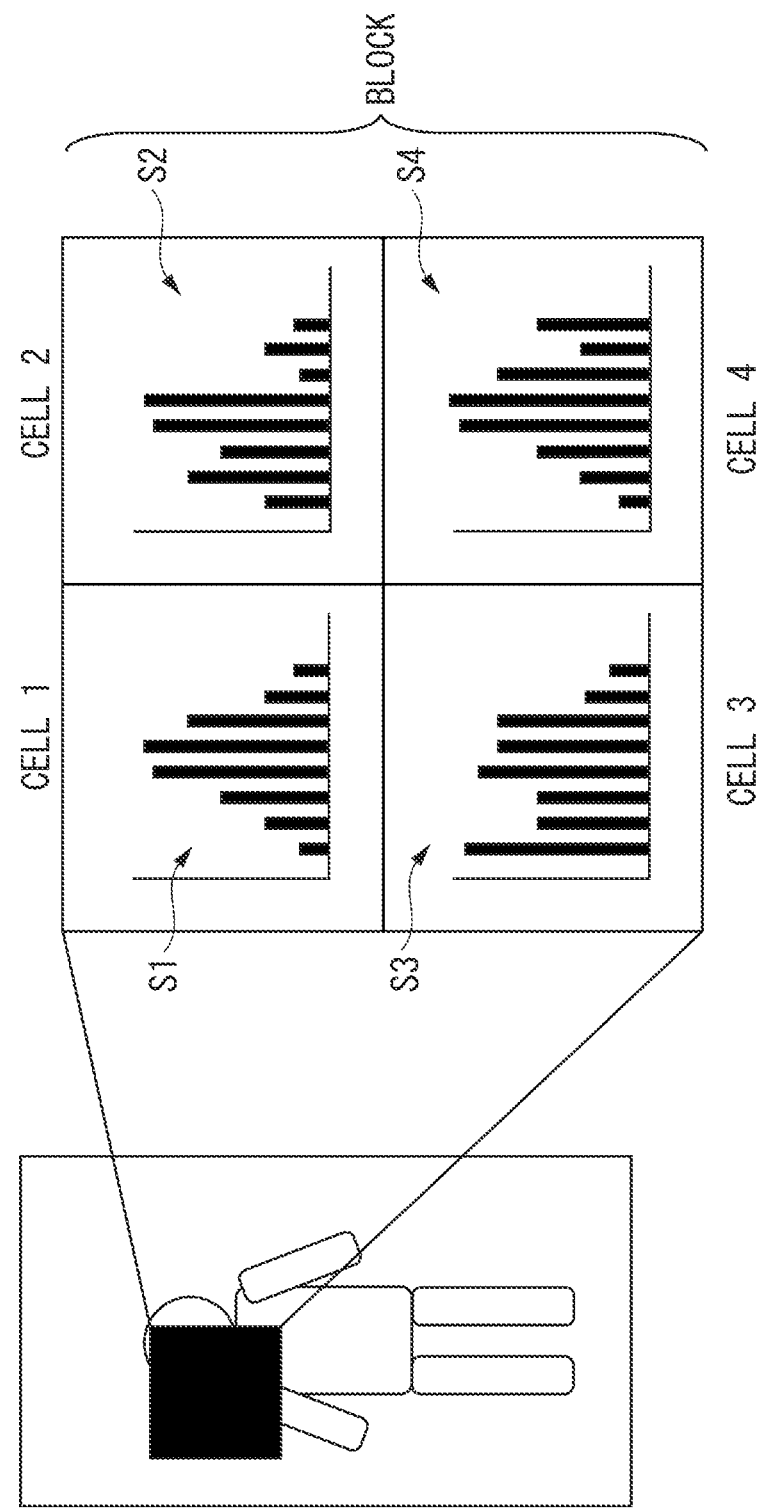
FIG. 5 illustrates an outline of histograms of oriented gradients (HOG) according to the first exemplary embodiment.

FIG. 5 illustrates an example of the HOG. In FIG. 5, gradient strength histograms S1 to S4 correspond to cells 1 to 4. FIG. 5 illustrates that four cells are set in the local region and a gradient strength histogram is created in eight directions in each cell. In this case, the final feature quantity are represented by 32 vector values as elements of all histograms in a block.

Each weak discriminator in the present exemplary embodiment has information about a position of the block, a position of a specific cell in the block, and the specific direction in the specific cell. For example, in the block illustrated in FIG. 5, the value of one direction in one cell represents one weak discriminator. In the relationship between the block and the cell illustrated in FIG. 5, the 32 weak discriminators correspond to one block. As described above, the weak discriminators are set in all local regions illustrated in FIG. 4. The weak discriminators are taken as candidate weak discriminators. A weak discriminator which is superior in performance of discriminating a learning image is sequentially selected by machine learning.

The following describes a method for selecting a weak discriminator which is superior in discrimination performance from candidate weak discriminators. The following processing is performed in the weak discriminator selection unit 110.

Figure 6:
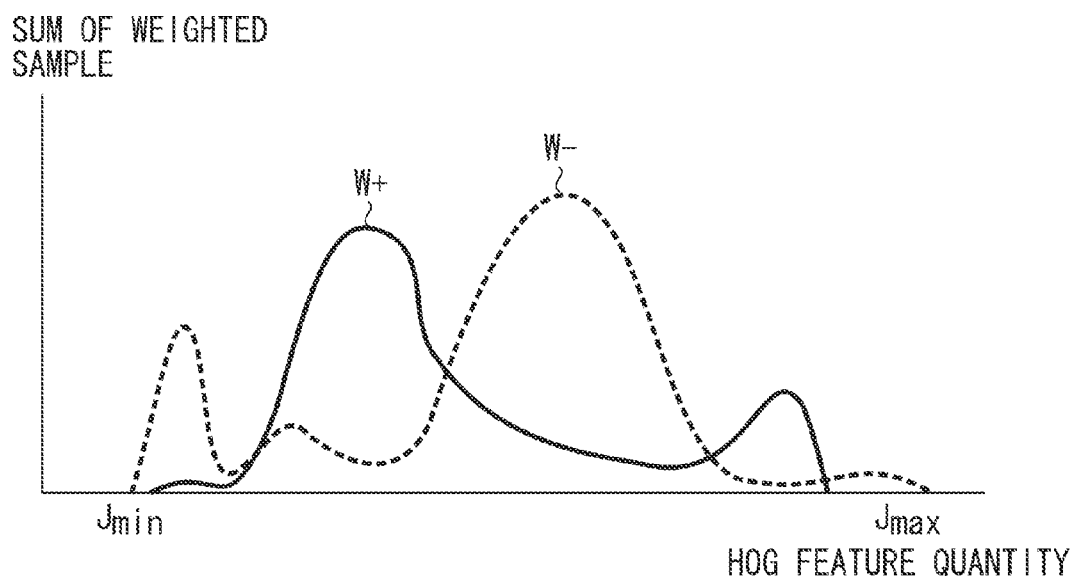
FIG. 6 illustrates a probability density distribution of a learning image according to the first exemplary embodiment.

In step S207, the probability density distributions $W_+^j$ and $W_-^j$ of the weak discriminator m are generated. The probability density distributions $W_+^j$ and $W_-^j$ are generated using the above equations (3) to (5). FIG. 6 illustrates an example of the probability density distributions. The abscissa indicates a feature quantity of HOG and the ordinate indicates the total of weighted images. A solid line indicates the probability density distribution $W_+$ of a correct answer image and a broken line indicates the probability density distribution $W_-$ of a non-correct answer image.

In step S208, a selection evaluation value $Z_m$ of the weak discriminator m is calculated. The selection evaluation value $Z_m$ is the one for selecting the weak discriminator that is better in discrimination performance than all weak discriminators 1 to M. The selection evaluation value $Z_m$ in the weak discriminator m is represented by the following equation (8).

$$Z_m = 2\sum_j \sqrt{W_+^j W_-^j} \qquad (8)$$

The smaller the overlapping of the probability density distribution of the correct answer image with that of the non-correct answer image, the lower the value of the equation (8). In other words, the better the discrimination performance of the weak discriminator, the smaller the selection evaluation value $Z_m$.

In step S209, it is determined whether all the candidate weak discriminator are processed. If it is determined that all the candidate weak discriminator are processed (YES in step S209), the processing proceeds to step S210. If not, (NO in step S209), the processing returns to step S206 and repeats the processing to step S209.

In step S210, a weak discriminator $h_t$ which is the smallest in the selection evaluation value $Z_m$ is selected as the weak discriminator that is the best in discrimination performance among all weak discriminators 1 to M. As illustrated in FIG. 6, the probability density distributions $W_+^j$ and $W_-^j$ are continuous values, the amount of data of the discriminators becomes enormous if an output function is kept unchanged. In step S211, the output function of the weak discriminator $h_t$ is integrated into a bin with a finite number. Thus, the distribution is integrated into the bin with a finite number to convert the distribution into probability density distribution data which the discriminator can easily hold. Integration into the bin is performed by using the following equations (9) and (10).

$$W_+^b = \int_{j=(b-1)\times Range}^{b\times Range} W_+^j \, dj, \qquad (9)$$

$$W_-^b = \int_{j=(b-1)\times Range}^{b\times Range} W_-^j \, dj \ (b = 1, 2, \cdots, 32)$$

$$Range = \frac{(J_{max} - J_{min})}{Nbin} \qquad (10)$$

Where, $W_+^b$ and $W_-^b$ are the probability density distributions acquired after the integration into the bin. Jmax and Jmin are the maximum and the minimum of a range of a possible feature quantity j in the probability density distribution. Range is the range of j corresponding to one bin and is expressed by the equation (10). Nbin is the number of bins after the integration and is 32 in the present exemplary embodiment.

Figure 7:
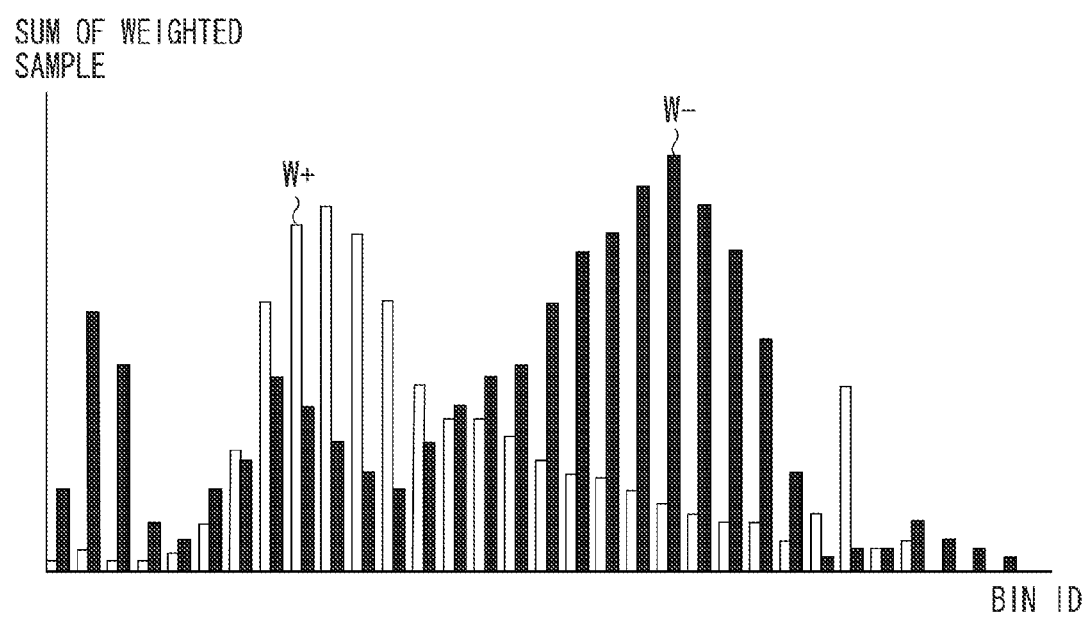
FIG. 7 illustrates the probability density distribution integrated into bins according to the first exemplary embodiment.

FIG. 7 illustrates results that the probability density distribution is integrated into 32 bins. White bars indicate correct answer images and black bars indicate non-correct answer images. The output function of the weak discriminator $h_t$ is represented by the following equation (11) and b indicates ID of the bin.

$$h_t(x_i) = \frac{1}{2}\ln\frac{W_+^b + \varepsilon}{W_-^b + \varepsilon} \ (b = 1, 2, \cdots, 32) \qquad (11)$$

In step S212, the output value correction unit 111 corrects the output of the weak discriminator $h_t$. The following describes a correction method. In the present exemplary embodiment, when the weight corresponding to the images is large while the number of learning images integrated into the bin is a few, the output of the bin is corrected to zero. This can be expressed by the following equation (12).

$$h_t(x_i) = \begin{cases} \frac{1}{2}\ln\frac{W_+^b + \varepsilon}{W_-^b + \varepsilon} \\ 0 \ \left(\text{if: } \frac{NP_b + NN_b}{N} \le Th \text{ and } (W_+^b > th_+ \text{ or } W_-^b > th_-)\right) \end{cases} \qquad (12)$$

$(b = 1, 2, \cdots, 32)$

Where, N is the sum of learning images, $NP_b$ is the number of correct answer images allocated to a bin, and $NN_b$ is the number of non-correct answer images allocated to a bin. Th is a threshold of a rate of learning images integrated into the bin to all learning images, $th_+$ is a threshold of a weight of the bin to correct answer images, and $th_-$ is a threshold of a weight of the bin to non-correct answer images. The above correction processing corrects the output of the weak discriminator $h_t$ to lower a certainty factor.

FIG. 8 is a chart illustrating distribution acquired before and after the output value of the weak discriminator $h_t$ is corrected. In this case, the output values of the bins indicated by A and B are corrected to zero. The corrected distribution illustrated in FIG. 8 is recorded in final strong and weak discriminators as a conversion table (hereinafter referred to as likelihood conversion LUT) for calculating the likelihood of the weak discriminator $h_t$.

In the present exemplary embodiment, the output value of the weak discriminator $h_t$ is corrected to zero, however, the output value of the weak discriminator $h_t$ may be corrected to minimize the influence of the output value on the detection result. For example, the use of a function represented by the following equation (13) enables realizing a correction for minimizing the influence of the output value on the detection result.

$$h_t = h_t \times \lambda \ (0 \le \lambda \le 1.0) \tag{13}$$

Similar effect can be realized by acquiring $\epsilon$ of the equation (12) from the following equation (14).

$$\varepsilon = k \times \frac{N}{NP_b + NN_b} \times (W_+^b + W_-^b) \tag{14}$$

Where, k is a variable and is larger in value than $W_+^b$ or $W_-^b$.

In step S213, the threshold determination unit 112 determines a threshold corresponding to the weak discriminator $h_t$. The threshold may be determined such that the weak discriminator $h_t$ is applied to the learning image and its detection rate and error detection rate satisfy predetermined values. In step S214, the learning image weight control unit 113 updates the weight to the learning image based on the above equation (5). In step S215, it is determined whether the learning processing satisfies an end condition. If it is determined that the learning processing satisfies the end condition (YES in step S215), the processing is ended. If not (NO in step S215), the processing returns to step S204 and repeats the processing to step S215. For the end conditions for learning, the strong discriminators produced until then may determine whether to satisfy a target performance for a learning image or a separately prepared image set, alternatively, the processing may be ended if learning is performed by the predetermined number of cycles.

Figure 11:
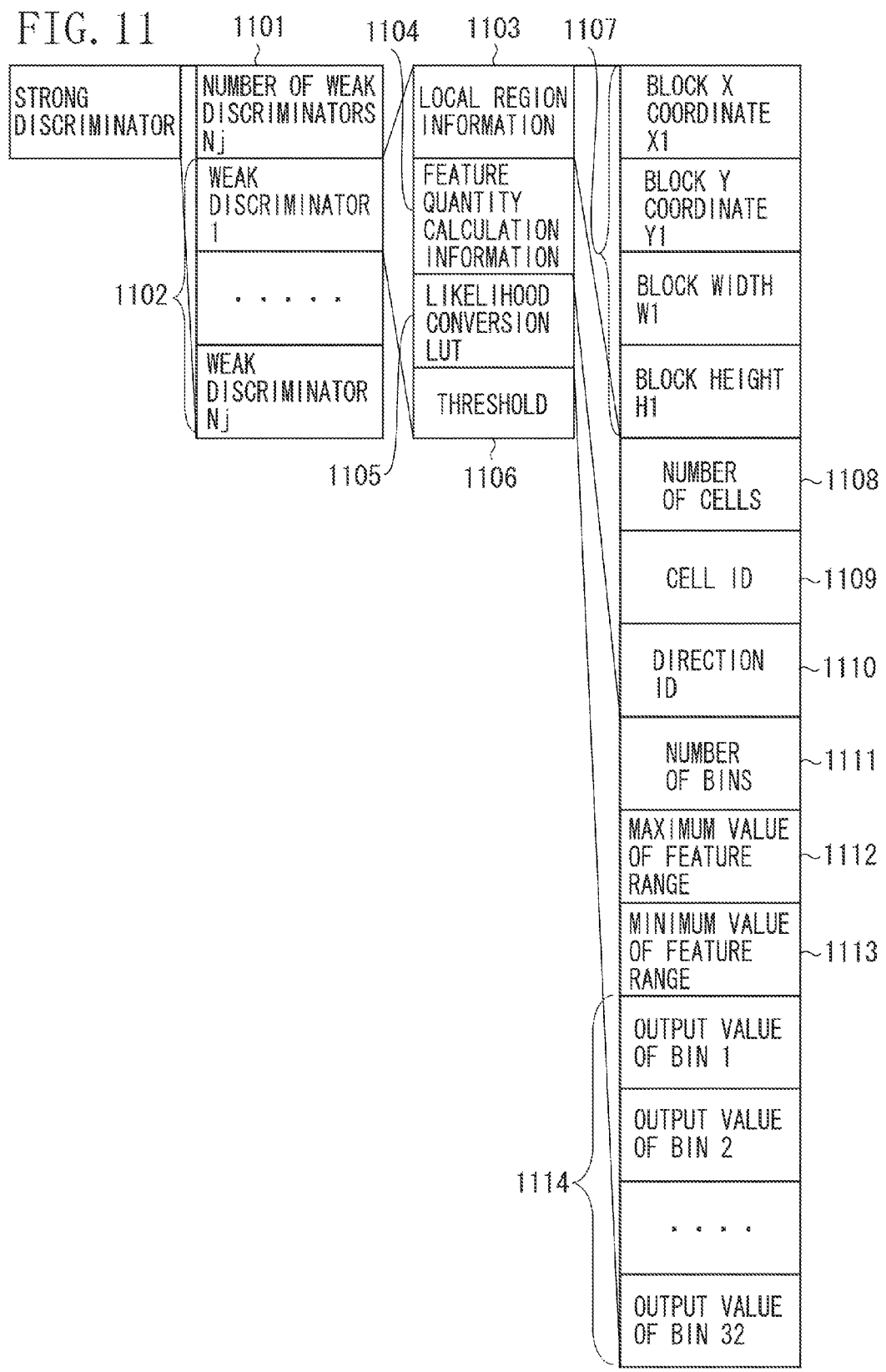
FIG. 11 illustrates a configuration of a strong discriminator in the first exemplary embodiment.

FIG. 11 illustrates the strong discriminator generated based on the above description. Various types of information used in detection among the values calculated in learning are held in the structure illustrated in FIG. 11. The number of pieces 1101 represents the total number of weak discriminators. Weak-discriminator information 1102 includes local region information 1103, feature quantity calculation information 1104, likelihood conversion LUT 1105, and threshold 1106. The local region information 1103 is a block area of the HOG in the present exemplary embodiment, so that the local region information 1103 is rectangular information of the block area 1107. The feature quantity calculation information 1104 includes the number of cells of the HOG 1108, cell ID 1109, and direction ID 1110. The likelihood conversion LUT 1105 includes the number of bins 1111, the maximum value of a feature quantity range in learning 1112, the minimum value of a feature quantity range in learning 1113, and the output value of each bin 1114.

In the present exemplary embodiment, although the threshold is set to each weak discriminator, the threshold may be set only to the last weak discriminator in the strong discriminator, alternatively, a plurality of the strong discriminators may be connected in cascade.

Figure 3:
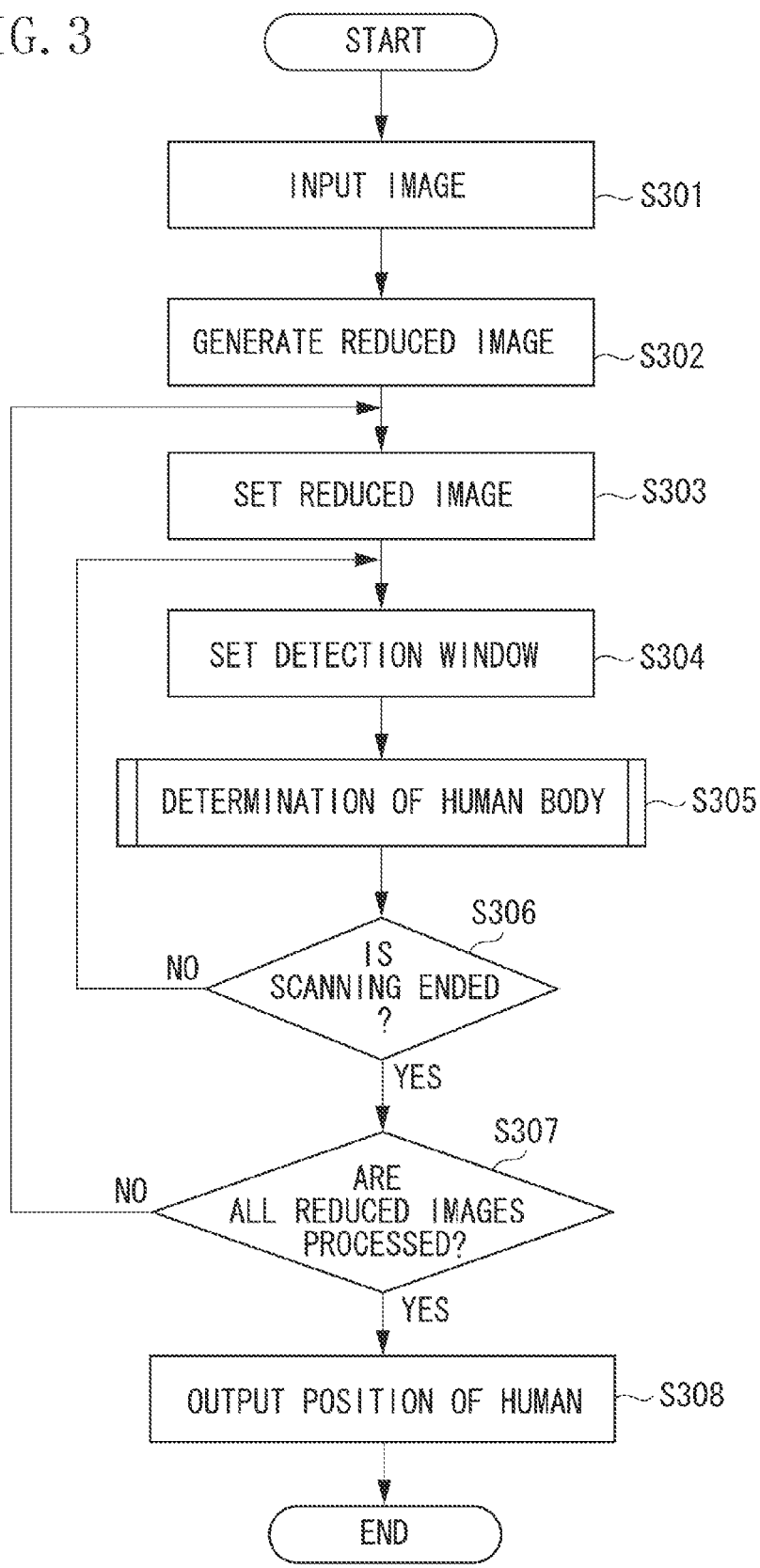
FIG. 3 is a flow chart illustrating an example of procedures for a human-body detection processing in the first exemplary embodiment.
Figure 9:
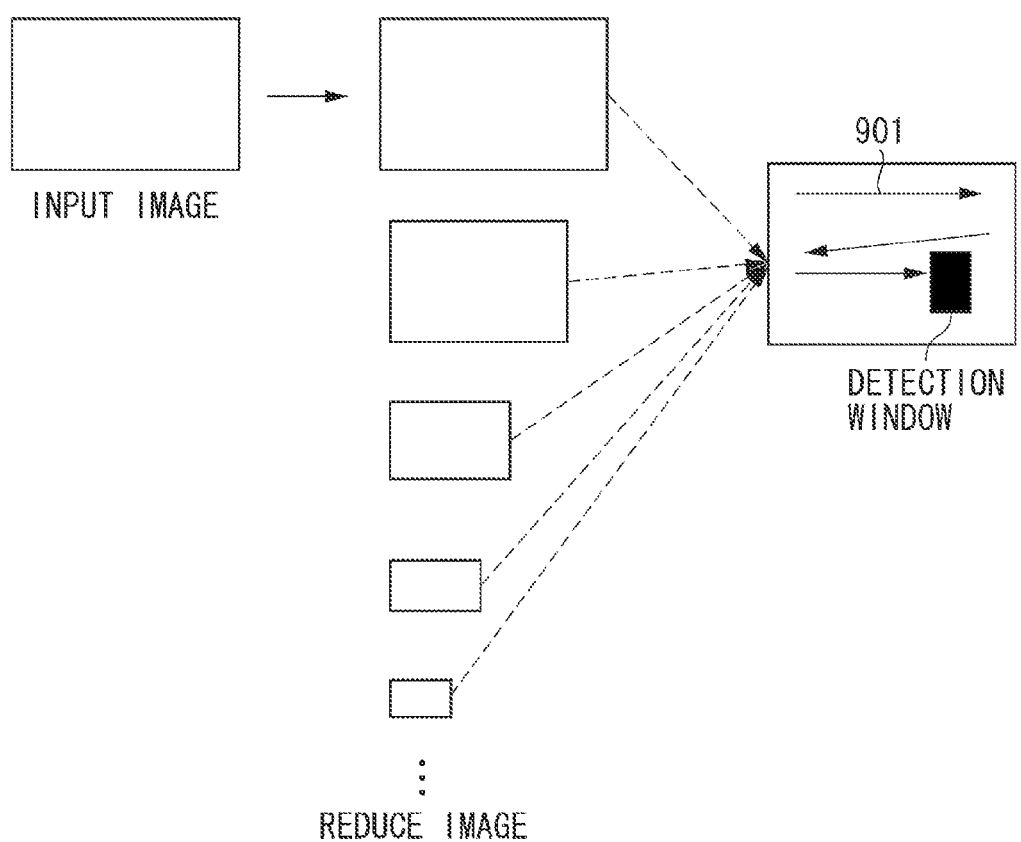
FIG. 9 illustrates an image scanning method of a detection window in detection processing according to the first exemplary embodiment.

There is described below an example in which a human body is actually detected using thus generated strong discriminator. The following detail description is performed with reference to a flow chart in FIG. 3. In step S301, an image is input. The flow of the processing from steps S302 to S304 is illustrated in FIG. 9. In step S302, the reduced-image generation unit 102 generates image data reduced to a predetermined magnification. This is performed to sequentially detect image data with a plurality of sizes, thereby enabling detection of human body of various sizes in the present exemplary embodiment. For example, reduction processing is sequentially applied to a plurality of images which is different in magnification by about 1.2 times from one another for detection processing at the subsequent stage.

In step S303, one reduced image is set from among the reduced images with a plurality of sizes generated in step S302. In step S304, the detection window setting unit 103 sets a sub region with a predetermined size on the reduced image. Hereinafter, the sub region is referred to as a detection window. The subsequent determination processing is applied to the detection window. The detection window scans the image in the horizontal and vertical directions as indicated by an arrow 901 by steps of several pixels to search the whole area of the reduced image.

In step S305, it is determined whether the detection window includes a human. A detailed flow of the determination processing will be described below. In step S306, it is determined whether the detection window scans throughout the reduced image. If it is determined that the detection window scans throughout the reduced image (YES in step S306), the processing proceeds to step S307. If not (NO in step S306), the processing returns to step S304 and repeats the processing to step S306.

In step S307, it is determined whether all reduced images are subjected to the processing to step S306. If it is determined that all reduced images are subjected to the processing (YES in step S307), the processing proceeds to step S308. If not (NO in step S307), the processing returns to step S303 and repeats the processing to step S307.

In step S308, the position of the human in the input image is output based on the detection window determined as including the human. The position of the detection window is the position in a coordinate system in the reduced image, so that the coordinate in which the position is converted into the coordinate system of the input image is output as the final detection position.

Figure 10:
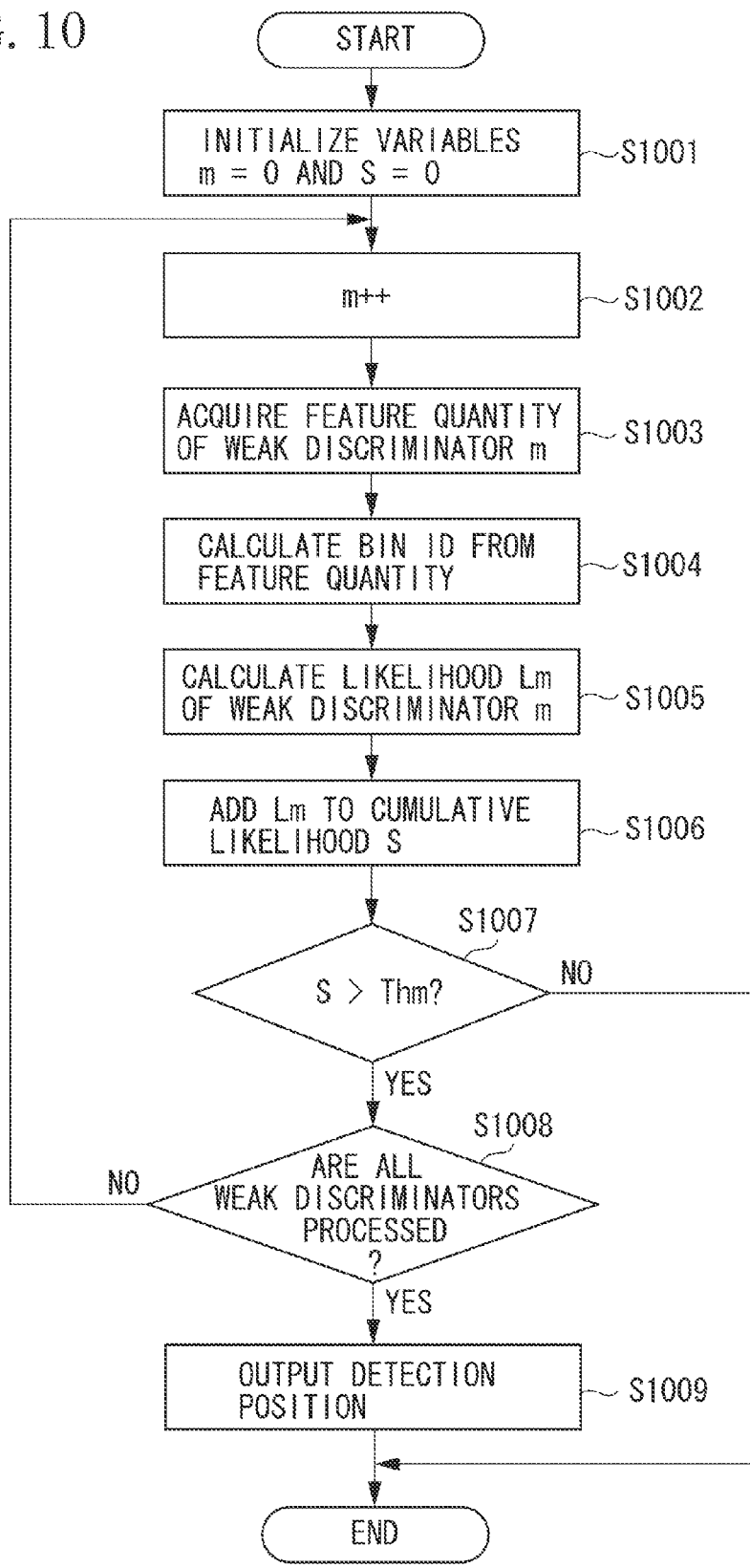
FIG. 10 is a flow chart illustrating an example of procedures for a human-body detection processing in the first exemplary embodiment.

A detailed flow of the determination processing in step S305 will be described below with reference to FIG. 10. In step S1001, a variable m representing the ID of the weak discriminator and a variable S representing the cumulative likelihood are initialized to zero. In step S1003, one is added to the variable m. In step S1003, the feature quantity calculation unit 104 calculates the feature quantity of the weak discriminator m. The feature quantity calculation unit 104 reads local region information and feature quantity calculation information which correspond to the weak discriminator m from the strong discriminator illustrated in FIG. 11 to calculate feature quantity from the detection window set in step S304.

In step S1004, the likelihood calculation unit 105 calculates the bin ID for referring to the likelihood conversion LUT from the feature quantity calculated in step S1003. A bin IDB(j) is calculated by the following equation (15) based on the feature quantity j calculated in step S1003, the maximum value of a feature range $J_{max}$, the minimum value of a feature range $J_{min}$, and the number of bins Nbin which are acquired from the strong discriminator illustrated in FIG. 11. Where, range is calculated by the above equation (10).

$$B(j) = \frac{j - J\min}{\text{Range}} + 1 \qquad (15)$$

(provided that, $j < J\min \rightarrow j = J\min$, $j > J\max \rightarrow j = J\max$)

In step S1005, the likelihood calculation unit 105 calculates the likelihood of the weak discriminator m. The likelihood calculation unit 105 reads the likelihood conversion LUT from the strong discriminator illustrated in FIG. 11 to calculate the likelihood $L_m$ based on the likelihood conversion LUT and the bin ID acquired in step S1004. In step S1006, the likelihood $L_m$ is added to the cumulative likelihood S.

In step S1007, the determination unit 106 reads the threshold $Th_m$ from the strong discriminator illustrated in FIG. 11 to determine whether the cumulative likelihood S exceeds the threshold $Th_m$ corresponding to the weak discriminator m. If the cumulative likelihood S exceeds the threshold $Th_m$ (YES in step S1007), the processing proceeds to step S1008. If not (NO in step S1007), the determination unit 106 determines that the detection window of interest is not in the human region and the processing is ended.

In step S1008, it is determined whether all weak discriminators are processed. If all weak discriminators are processed (YES in step S1008), the processing proceeds to step S1009. If not (NO in step S1008), the processing returns to step S1002 and repeats the processing to step S1008. In step S1009, the determination result output unit 107 outputs the position of the detection window of interest as the detection position.

As described above, according to the present exemplary embodiment, the likelihood output when a feature pattern which is not included so much in a learning image is input in the machine learning is corrected to reduce the influence on the final detection results. This enables a stable detection even if the image including the above feature pattern is input.

Figure 12:
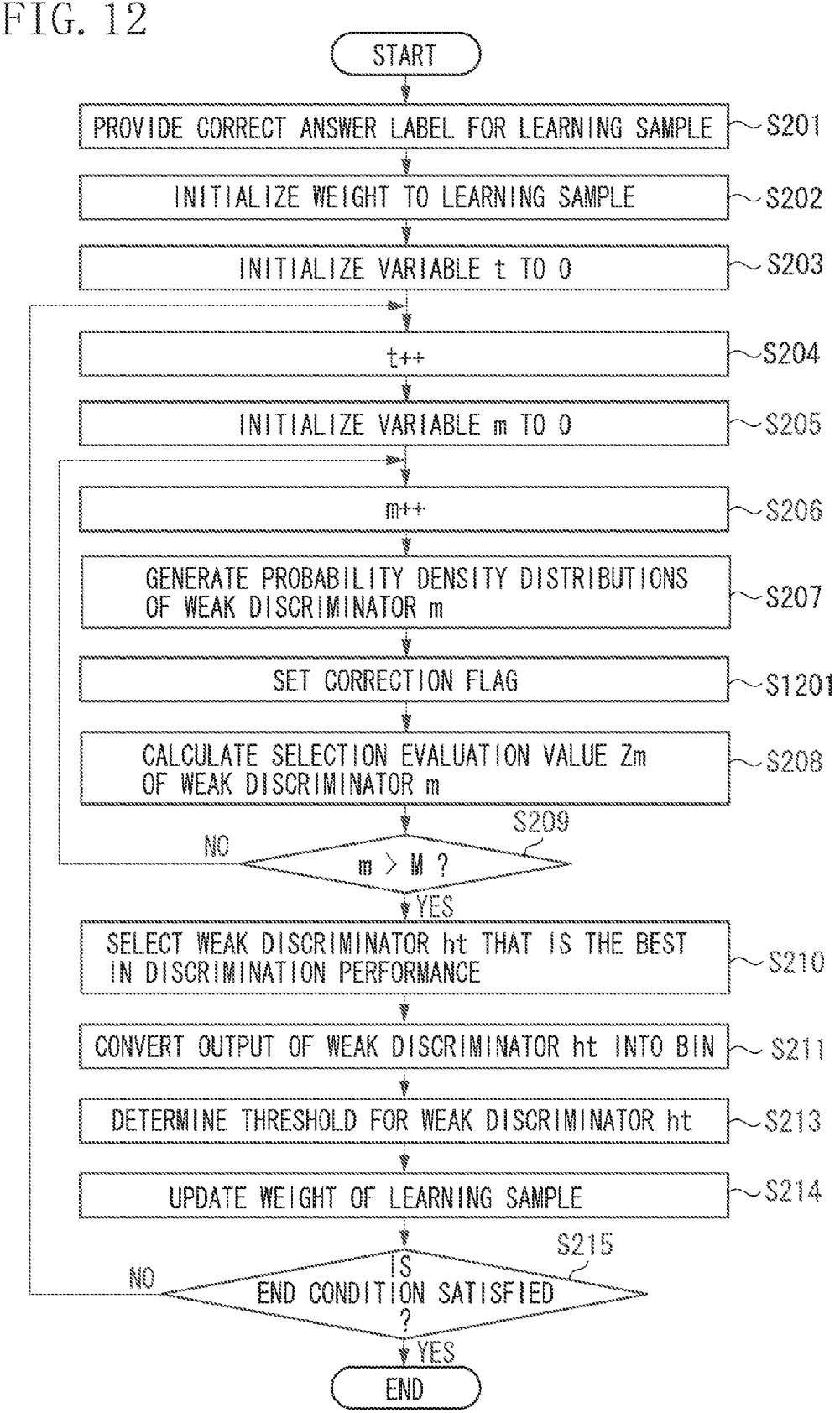
FIG. 12 is a flow chart illustrating an example of procedures for machine learning processing in a second exemplary embodiment.

In the present exemplary embodiment, the discriminator holds information about the probability density distribution of the learning image used in learning, on the basis of which the likelihood at the time of detection is corrected. Only the part of the present exemplary embodiment which is different from the first exemplary embodiment will be described below. The flow of the learning processing in the present exemplary embodiment is described using the flowchart in FIG. 12. In the flow chart in FIG. 12, the processing of the present exemplary embodiment which is similar to that of the first exemplary embodiment is given the same reference characters and numerals to omit the description thereof.

In step S1201, a correction flag is set. The correction flag refers to the flag that indicates whether the output of each bin in the probability density distribution integrated into the bin needs to be corrected at the time of detection. The correction flag is set as true if the weight corresponding to learning images is large irrespective of the fact that the number of the learning images integrated into the bin of interest in learning is a few. For the truth and false of the correction flag, it is determined whether the bin of interest in the probability density distribution integrated into the bin satisfies the condition in the latter part of the equation (12) and, if the bin of interest satisfies the condition, it is determined that correction is required and the correction flag is set as true, if not, the correction flag is set as false. The correction flag is used in detection, so that the flag is added to the discriminator.

Figure 13:
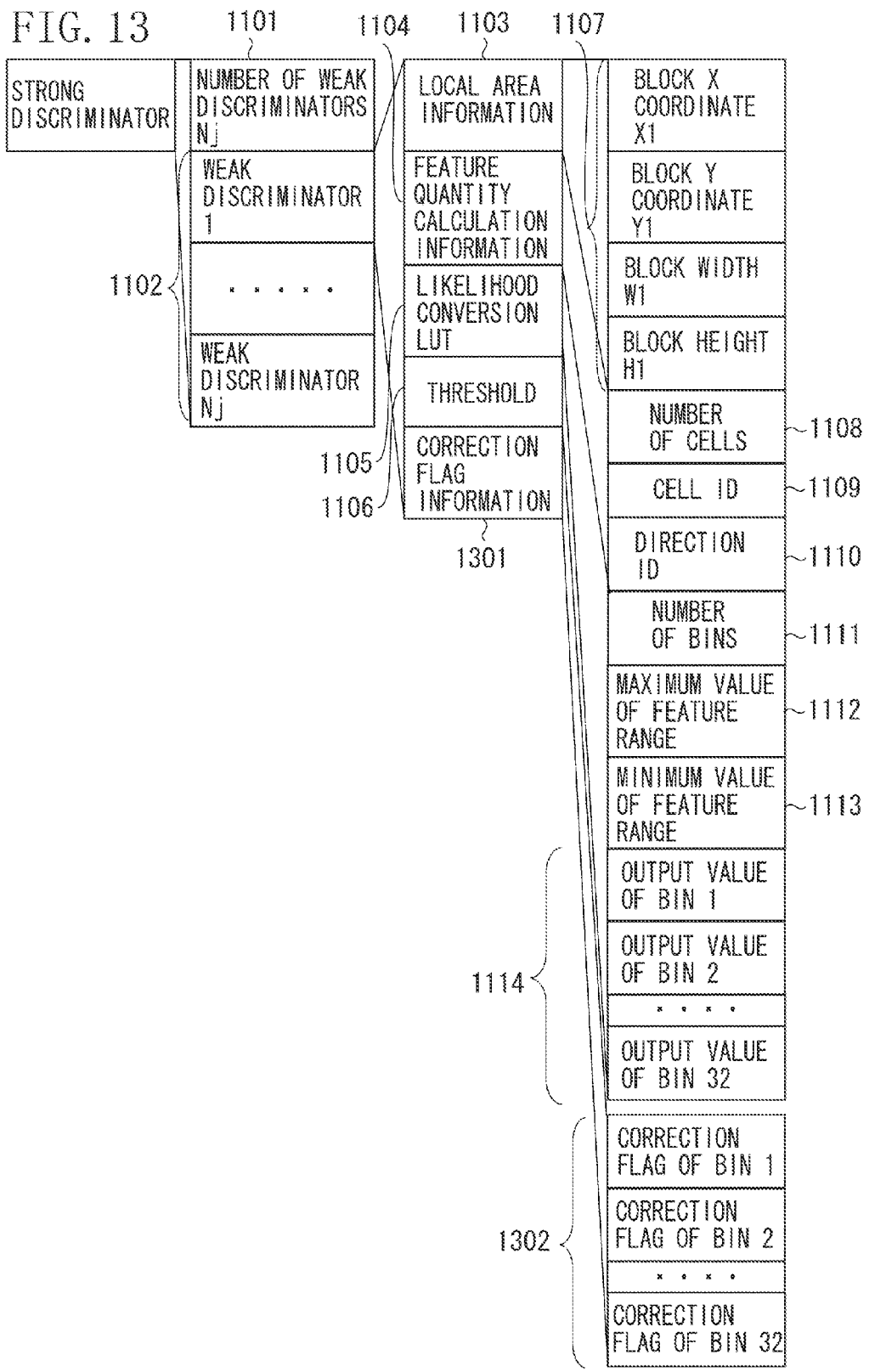
FIG. 13 illustrates a configuration of a strong discriminator in the second exemplary embodiment.

FIG. 13 illustrates an example in which information about the correction flag is added to the discriminator. The weak-discriminator information 1102 includes correction-flag information 1301 and the correction-flag information 1301 includes correction flags 1302 the number of which corresponds to that of the bins.

Figure 14:
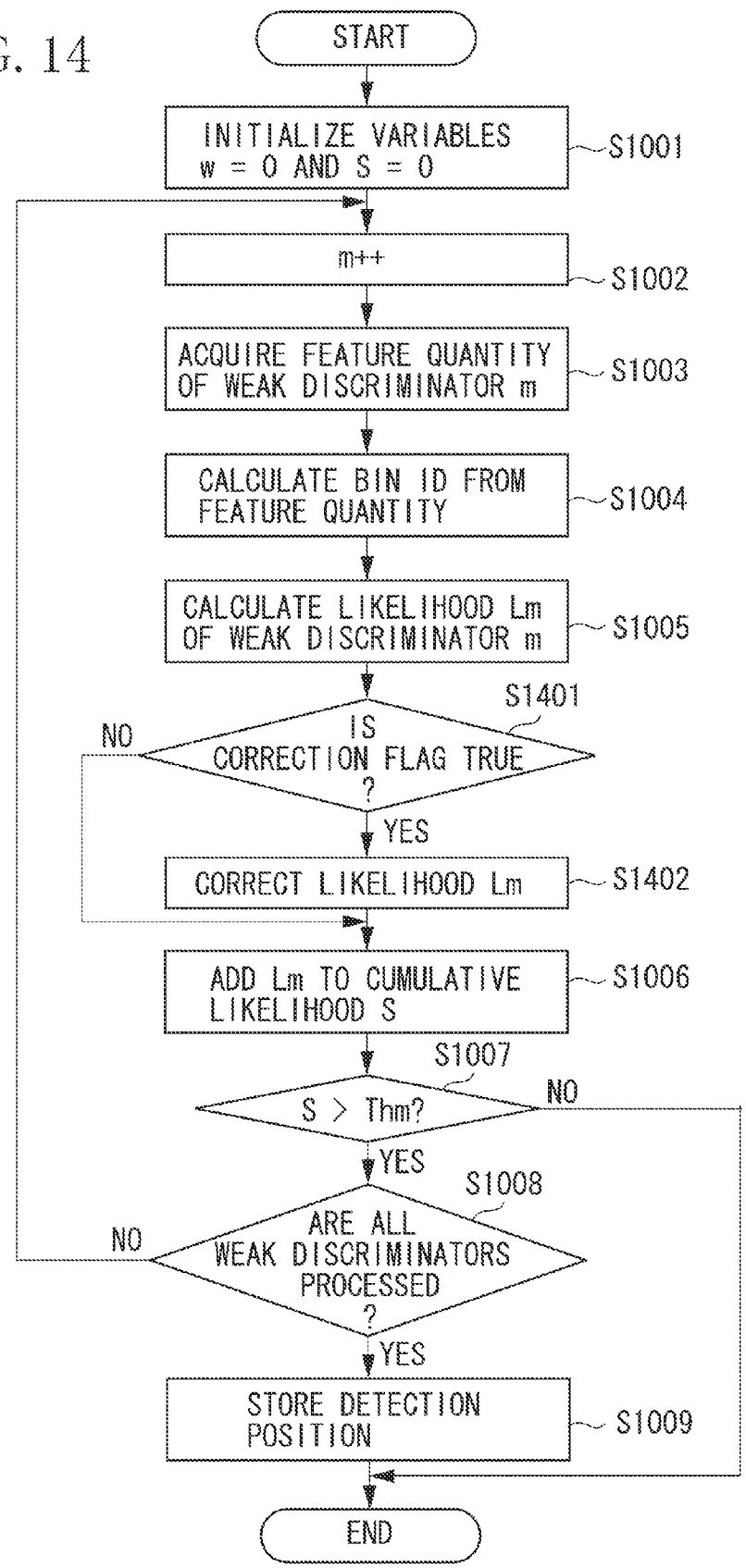
FIG. 14 is a flow chart illustrating an example of procedures for a human-body detection processing in the second exemplary embodiment.

The detection processing of the present exemplary embodiment will be described below. The determination of a human body (in step S305) of the present exemplary embodiment, which is different from that of the first exemplary embodiment in the flow chart for detecting a human body, will be described below with reference to a flow chart in FIG. 14. In FIG. 14, the processing of the present exemplary embodiment which is similar to that of the first exemplary embodiment is given the same reference characters and numerals to omit the description thereof.

In step S1401, it is determined whether the correction flag corresponding to the bin ID calculated in step S1004 is true. The correction flag held by the strong discriminator illustrated in FIG. 13 is read for determination. If it is determined that the correction flag is true (YES in step S1401), the processing proceeds to step S1402 to correct the value of the likelihood $L_n$. If not (NO in step S1401), the processing proceeds to step S1006 to add the likelihood $L_m$ to the cumulative likelihood S.

In step S1402, the likelihood $L_m$ is corrected according to the equation (13) to decrease the reliability of the likelihood. At this point, the weak discriminator $h_t$ is replaced with the likelihood $L_m$ in the equation (13). In the equation (13), the closer to zero $\lambda$ is, the smaller the influence of the likelihood on the detection result becomes.

In step S1401, if there are an extremely large number of the weak discriminators in which the correction flag is determined as true, this means that there are image patterns difficult to determine in the all regions of the detection window. Such images are particular images that are not originally included in the learning image, so that a forcible detection processing may frequently cause error detection. Therefore, in step S1401, it is not only determined whether the correction flag is true, but also a processing for counting the number of times of correction is added in which the number of the weak discriminators determined as true is counted, thereby interrupting the detection processing if the count exceeds a predetermined value.

As described above, according to the present exemplary embodiment, the discriminator holds information about the probability density distribution of the learning image used in learning, so that the likelihood can be corrected at the time of detection. Consequently, the correction degree of the likelihood is changed according to arrangement environment or application to realize an appropriate detection accuracy for various applications.

Other Embodiments

Aspects of the present invention can also be realized by a computer of a system or apparatus (or devices such as a CPU or MPU) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (e.g., computer-readable medium). In such a case, the system or apparatus, and the recording medium where the program is stored, are included as being within the scope of the present invention.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2011-099968 filed Apr. 27, 2011, which is hereby incorporated by reference herein in its entirety.

What is claimed is:

1. A recognition apparatus comprising:
a generation unit configured to generate, for each of a plurality of discriminators, probability density distributions of correct and non-correct answers with respect a plurality of learning leaning images;
a calculation unit configured to calculate, for each of the plurality of discriminators, an evaluation value based on the probability density distributions;
a selection unit configured to select at least one of the plurality of discriminators based on respective evaluation values;
a correction unit configured, if a ratio of a learning image with respect to a specific feature quantity is equal to or smaller than a predetermined ratio and a weight for the specific feature quantity is greater than a predetermined value, to correct a value of likelihood for the selected discriminator associated with the specific feature quantity to lower the value;
a setting unit configured to set for the selected discriminator, a threshold of the value of likelihood corrected by the correction unit in association with a feature quantity; and
a discrimination unit configured to extract a feature quantity from an input image and discriminate whether the input image includes a predetermined object by the selected discriminator, based on the likelihood associated with the feature quantity and the threshold set for the feature quantity.

2. The recognition apparatus according to claim 1, further comprising an integration unit configured to integrate likelihood of each of the feature quantity for each interval of feature quantity, wherein
the correction unit is configured, if a ratio of a learning image to a feature quantity integrated in a specific interval is equal to or smaller than a predetermined ratio and a weight for the feature quantity of the specific interval is greater than a predetermined value, to correct the value of likelihood the feature quantity of the specific interval to lower the value.

3. The recognition apparatus according to claim 1, wherein the calculation unit is configured to calculate likelihood of each feature quantity for each local region of the plurality of learning images, and wherein the discrimination unit is configured to integrate the likelihood of the input image for each local region and determine whether the input image includes a predetermined object.

4. The recognition apparatus according to claim 1, wherein the correction unit is configured, if the ratio of the learning image with respect to a specific feature quantity is equal to or smaller than a predetermined ratio and a weight for the specific feature quantity is greater than a predetermined value, to reduce the value of likelihood of the specific feature quantity to zero.

5. A recognition apparatus comprising:
a generation unit configured to generate, for each of a plurality of discriminators, probability density distributions of correct and non-correct answers with respect a plurality of learning leaning images;
an identification unit configured to identify a feature quantity in which the ratio of the learning image is equal to or smaller than a predetermined ratio and its weight is greater than a predetermined value;
a calculation unit configured to calculate, for each of the plurality of discriminators, an evaluation value based on the probability density distributions;
a selection unit configured to select at least one of the plurality of discriminators based on respective evaluation values;
a correction unit configured to extract a feature quantity from an input image, obtain a value of likelihood associated with the feature quantity, and correct the value of likelihood to lower the value if the feature quantity is identified by the identification unit;
a setting unit configured to set for the selected discriminator, a threshold of the value of likelihood corrected by the correction unit in association with a feature quantity; and
a discrimination unit configured to discriminate whether the input image includes a predetermined object by the selected discriminator, based on the likelihood corrected by the correction unit associated with the feature quantity and the threshold set for the feature quantity.

6. A recognition method comprising:
generating, for each of a plurality of discriminators, probability density distributions of correct and non-correct answers with respect a plurality of leaning images;
calculating, for each of the plurality of discriminators, an evaluation value based on the probability density distributions;
selecting at least one of the plurality of discriminators based on respective evaluation values;
correcting, if a ratio of a learning image with respect to a specific feature quantity is equal to or smaller than a predetermined ratio and a weight for the specific feature quantity is greater than a predetermined value, a value of likelihood for the selected discriminator associated with the specific feature quantity to lower the value;
setting for the selected discriminator, a threshold of the value of likelihood corrected by the correcting step in association with a feature quantity; and
extracting a feature quantity from an input image and discriminate whether the input image includes a predetermined object by the selected discriminator, based on the likelihood associated with the feature quantity and the threshold set for the feature quantity.

7. A recognition method comprising:
generating, for each of a plurality of discriminators, probability density distributions of correct and non-correct answers with respect a plurality of leaning images;

identifying a feature quantity in which the ratio of the learning image is equal to or smaller than a predetermined ratio and its weight is greater than a predetermined value;

calculating, for each of the plurality of discriminators, an evaluation value based on the probability density distributions;

selecting at least one of the plurality of discriminators based on respective evaluation values;

extracting a feature quantity from an input image, obtain a value of likelihood associated with the feature quantity, and correct the value of likelihood to lower the value if the feature quantity is identified by the identifying step;

setting for the selected discriminator, a threshold of the value of likelihood corrected by the extracting step in association with a feature quantity; and discriminating whether the input image includes a predetermined object by the selected discriminator, based on the likelihood corrected by the extracting step associated with the feature quantity and the threshold set for the feature quantity.

8. A non-transitory computer readable storage medium storing a program for causing a computer to execute a recognition method according to claim 6.

9. A non-transitory computer readable storage medium storing a program for causing a computer to execute a recognition method according to claim 7.

* * * * *